United States Patent [19]

Mercuri

[11] Patent Number: 4,911,972
[45] Date of Patent: Mar. 27, 1990

[54] INSULATING COMPOSITE GASKET

[75] Inventor: Robert A. Mercuri, Seven Hills, Ohio

[73] Assignee: Union Carbide Corporation, Danbury, Conn.

[21] Appl. No.: 231,711

[22] Filed: Aug. 12, 1988

[51] Int. Cl.$^4$ .................. B32B 3/06; B32B 15/04
[52] U.S. Cl. .................................. 428/99; 277/1;
277/230; 277/235 R; 428/100; 428/133;
428/244; 428/332; 428/337; 428/457; 428/472
[58] Field of Search ............... 428/244, 285, 408, 133,
428/99, 100, 472, 457, 133, 332, 337; 277/235,
230, 1, 235 R

[56] References Cited

U.S. PATENT DOCUMENTS

| | | | |
|---|---|---|---|
| 3,404,061 | 10/1968 | Shane et al. | 428/408 |
| 4,234,638 | 11/1980 | Yamazoe et al. | 428/133 |
| 4,463,959 | 8/1984 | Usher et al. | 277/230 |
| 4,516,782 | 5/1985 | Usher | 277/1 |
| 4,519,619 | 5/1985 | Doyle | 277/235 |

Primary Examiner—Thomas J. Herbert
Attorney, Agent, or Firm—C. F. O'Brien

[57] ABSTRACT

A composite sheet suitable for manufacturing thermally insulating gaskets for use between an aluminum head and steel muffler of an internal combustion engine, comprising a thermally insulating refractory fiber layer disposed between a metal layer and a flexible graphite layer.

12 Claims, 2 Drawing Sheets

INSULATING COMPOSITE GASKET

FIELD OF THE INVENTION

The present invention relates to composite sheet materials for manufacturing gaskets, in particular gaskets for use between the aluminum head and the muffler of small internal combustion engines.

BACKGROUND OF THE INVENTION

Small air-cooled internal combustion engines, those uesd, for example, for lawn mowers and other portable equipment, typically have engine heads of an aluminum alloy, with an exhaust muffler assembly, typically of steel, attached to the head. During operation of the engine the muffler becomes very hot from the heat of the exhaust gasses and the head. After the engine is shut off and the engine cools, heat flows back from the steel muffler assembly into the head. This heat flowing back into the aluminum head can cause localized hot spots, which in turn can lead to damage of the head.

This problem has been traditionally solved by use of an asbestos gasket placed between the muffler and the head. Asbestos gaskets have been successful in preventing head damage from heat feed-back from the muffler, but because of environmental problems associated with asbestos, there is a need in the industry to provide an inexpensive non-asbestos gasket in this application.

In order for a material to function successfully as a gasket between the aluminum head and the muffler, it must sufficiently inhibit heat feed-back from the muffler to prevent damage to the head. In addition, the material must be sufficiently resilient to provide a seal between the head and muffler and provide a minimum of leakage of exhaust gasses. The gasket should also be of sufficient strength to maintain its integrity during handling, installtion. A resistance to degradation at high temperatures is also important, due to the high temperatures of the exhaust gasses, head, and the muffler, during operation of the engine.

Gaskets for engine heads, exhaust mufflers, and the like, on internal combustion engines have been made as composites of flexible graphite and a reinforcing material, such as a steel mesh or a sheet of steel or a polymeric material. Examples of these gaskets are disclosed in U.S. Pat. Nos. 4,463,959, 4,516,782, 4,234,638, and 4,519,619. While these gaskets provide a seal against exhaust gasses, and have high temperature resistance, they are not suitable as gaskets for use between aluminum heads and steel mufflers in air cooled engines where heat flow back is a problem. The primary materials used for these gaskets, i.e. metals and flexible graphite, are thermal conductors, and provide a heat conduction path between the head and the muffler. Therefore, these gaskets are not suitable in inhibiting the flow of heat from the muffler to the head.

In addition, many of these gaskets incorporate polymeric materials which do not have sufficient thermal resistance to withstand the high temperatures encountered at the exhaust muffler in air-cooled engines. At operating temperatures found in mufflers, these materials would deteriorate, and the gasket would not provide an adequate seal to exhaust gasses.

OBJECTS OF THE INVENTION

An object of the invention is, therefore, to provide a gasket that can be used in place of asbestos for use between the muffler and aluminum head of air-cooled engines.

Another object of the invention is to provide a gasket which inhibit the flow back of heat in air cooled engines from the muffler assembly to the aluminum head.

Another object of the invention is to provide a gasket which provides a seal to exhaust gasses, is stable at high temperatures, and provides thermal insulation between the head and the muffler.

Other objects of the invention will become evident in the description that follows.

SUMMARY OF THE INVENTION

An embodiment of the invention is a composite sheet for the manufacture of gaskets which comprises a layer of metal, a layer of insulating refractory fiber, a layer of flexible graphite, and a bonding means for bonding the layers together with the insulating refractory fiber layer disposed between the layer of metal and the layer of flexible graphite.

Another embodiment of the invention is a method for manufacturing a composite sheet suitable for use as a gasket which method comprises bonding a sheet of metal, a sheet of insulating refractory fiber, and a sheet of flexible graphite together, with the insulating refractory fiber sheet disposed between the layer of metal an the layer of flexible graphite.

The composite sheet of the invention can be used for gaskets, particularly between the muffler and head of air-cooled engines. The gaskets have strength suitable for handling and have resistance to high temperatures, while providing thermal insulation between the head and muffler, thus preventing damage of aluminum heads due to the flow back of heat.

The layer of metal is to impart strength to the composite sheet and gasket for handling, i.e. during the packaging, shipping, installation, and the like. The metal layer may be of any suitable metal that is sufficiently strong for such handling. Suitable metals are steel, nickel, stainless steel, iron, aluminum, copper, brass, and other metals in the form of sheets. If low cost is a primary consideration, steel, or tin-plated steel is preferred. The metal layer is as thin as possible while still providing sufficient strength for handling. For steel, the thickness may, for example, vary between about 0.006 inches and about 0.01 inches. Although not preferred, other materials, other than metal may be substituted in the metal layer, if the strength and temperature resistance are sufficient for the intended use. For example, a polymeric material, such as teflon sheet, may be used in a lower temperature environment, or flexible graphite may be used where a low strength is sufficient.

The insulating refractory fiber may be any thermally insualting refractory material, such as ceramic fibers, and glass fibers. A suitable thermally insulating refractory material, for example, is vitreous aluminosilicate fibers, as used in the examples below. In general, any thermal insulator which is stable at the highest temperatures encountered by the gasket is suitable. For use in of air-cooled engines between the head and muffler assembly, temperatures as high as 700° C. or above are commonly encountered.

The refractory fiber layer should of a thickness so as to provide sufficient thermal insulation. In the preferred application in air-cooled engines, the thermal insulation should be sufficient to prevent damage of the aluminum head from heat flow back from the muffler. However, as refractory fiber materials are typically porous, the refractory fiber should not be so thick that there is excess leakage of exhaust gasses through the refractory fiber layer. Typically, a thickness between about 0.02 and about 0.04 inches is suitable.

The flexible graphite may be any of the flexible graphite sheet materials commercially available, from, for example, Union Carbide Corporation, Danbury, Conn., under the trademark GRAFOIL. Flexible graphite is generally manufactured by intercalation of natural particulate graphite flakes with an oxidizing solution, heating the intercalated flakes to a temperature to expand or exfoliate the graphite flakes, and compressing the expanded flakes into a sheet. Flexible graphite, and methods for the manufacture thereof, are disclosed in U.S. Pat. No. 3,404,061, to Shane et al. The thickness of the flexible graphite layer is not critical, but should be of sufficient thickness to provide a resilient surface to the gasket to provide a seal.

The layers of the composite gasket sheet are bonded together by any suitable bonding means. The bonding means holds the layers together during handling and installation of the gasket. The preferred means of bonding the layers together is a mechanical fastening means provided by punching tangs or projections into the metal layer and pressing the refractory fiber and the flexible graphite upon the projections. An alternate bonding means is by an adhesive material between the layers. Generally it is not necessary that the adhesive be a high temperature adhesive if after installation of the gasket, other means are sufficient to hold the gasket together. For example, in an air cooled engine, the mounting bolts used to hold the muffler, gasket, and head assembly together are sufficient to hold the gasket together. If due to high temperatures, the adhesive is volatilized or disintegrated, such means are usually sufficient to maintain the integrity of the gasket. Suitable adhesives include known glues, contact cements, binders, and the like.

The composite sheet of the invention is manufactured by conventional methods for forming composite sheets for gaskets by joining sheet materials together. Typically these methods involve pressing or rolling the layers until they bond together to form the composite sheet.

The gaskets may be formed from the composite sheet of the invention by any suitable means known in the art for manufacturing gaskets from sheet materials, such as cutting, punching, and the like.

The resulting composite sheet product is a insulating refractory fiber layer sandwiched between two layers which are substantially impervious to gas. This provides a gasket material with sufficient thermal insulation to inhibit the flow back of heat, as well as provide a seal against exhaust gasses.

Additional layer of any suitable material may also be incorporated into the gasket. As the metal layer typically provides sufficient strength, additional metal layers or additional reinforcing materials are not preferred. In addition, at least one of the two outer layers of the composite sheet is preferably of flexible graphite to provide sufficient resiliency for a seal against exhaust gas leakage. If cost is not the primary consideration, both outer layers may be of flexible graphite to provide an optimum seal. However, in the preferred application in air-cooled engines, one outer layer of flexible graphite is sufficient to provide an adequate seal. In this application, a suitable low cost gasket sheet comprises a single refractory fiber layer disposed between an outer flexible graphite layer and an outer metal layer.

Additional layers of refractory fiber may be added to increase the thermal insulation of the composite sheet. However, because insulating refractory fibers are generally porous, in order to prevent excessive gas leakage additional refractory fiber layers should be surrounded on both sides with essentially gas-impermeable layers. Additional layers of refractory fiber and flexible graphite may be added over the flexible grpahite layer or metal layer to produce, for example, a five layer gasket of metal, refractory fiber, flexible graphite, refractory fiber, and flexible graphite. Additional layers of refractory fiber and flexible graphite may be added in like manner to provide gaskets with 7, 9, 11 or more layers. In Table A below are illustrated some of the various gasket configurations contemplated by the invention.

TABLE A

| Composite Configurations |
|---|
| G-R-M |
| G-R-G-R-M |
| G-R-G-R-G-R-M |
| G-R-M-G |
| G-R-M-G-R-G |
| G-R-M-R-G |
| G-R-G-R-M-R-G |

G = Graphite Layer,
R = Refractory Fiber Layer
M = Metal Layer

Other materials used in the art for gaskets may also be incorporated into the gasket in the form of additional layers, surface treatments, impregnants, saturants, or the like.

The preferred use of the composite sheet of the invention is as a gasket between the exhaust muffler and the aluminum head of an air cooled internal combustion engine. However, gaskets of the invention are also useful in any joint wherein the gasket must function at high temperature, and also provide insulation between the parts being joined.

DETAILED DESCRIPTION OF THE INVENTION

Figure 1:
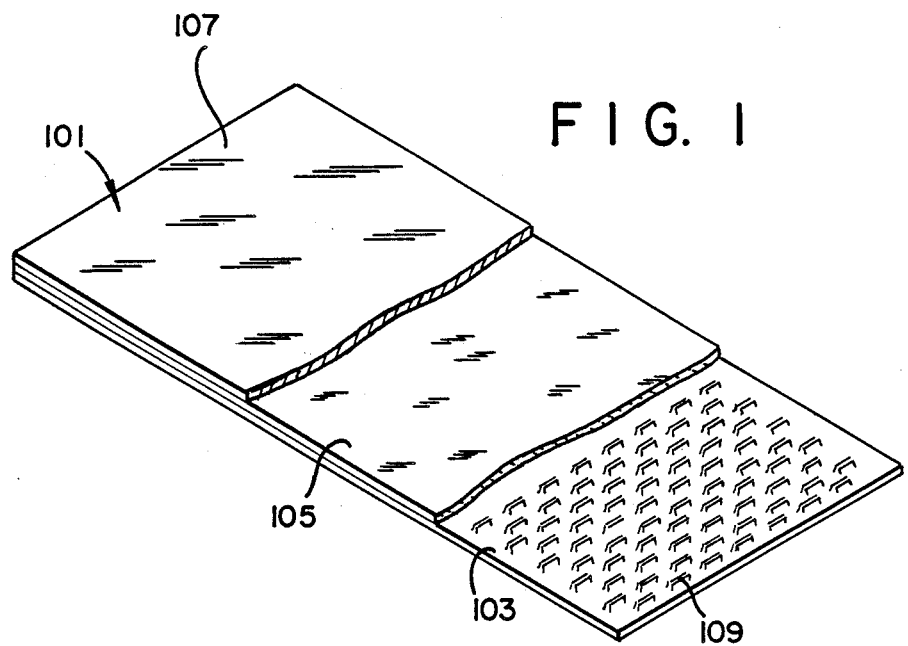
FIG. 1 is a perspective view of an embodiment of the composite sheet of the invention with the refractory fiber and flexible graphite partially removed for illustration purposes.
Figure 2:
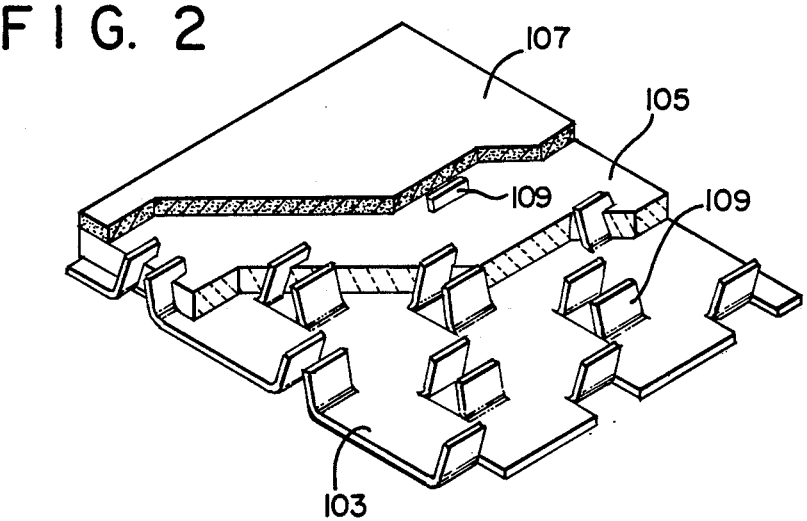
FIG. 2 is a detail view of the composite sheet of FIG. 1.

Referring to FIGS. 1 and 2, which illustrate an embodiment of the invention, composite sheet 101 comprises a layer of metal 103, a layer of insulating refractory fiber 105, and a layer of flexible graphite 107. In a specific embodiment of the invention, the metal layer 103 is steel, 0.007 inches thick. The refractory fiber layer 105 is FIBERFAX TM ceramic fiber, available from Standard Oil Engineered Materials, Fiber Division, Niagara Falls, N.Y., and is 0.033 inches thick. The flexible graphite 107 is GRAFOIL (registered trademark), available from Union Carbide Corporation, Danbury, Conn., and is 0.02 inches thick.

The composite sheet 101 is manufactured by punching tangs or projections 109 into the metal sheet used for the metal layer 103, and pressing a sheet of refractory fiber and a sheet of flexible graphite upon the projections to provide respectively the refractory fiber, and flexible graphite layers 105,107.

Referring to FIG. 2, the projections 109 in the metal layer 103 may be formed by a suitable tool which perforates the metal sheet and forms the projections 109. The projection 109 should be sufficiently long to extend through the refractory fiber layer 105 and into the flexible graphite layer 107 of the final composite sheet 101.

Figure 3:
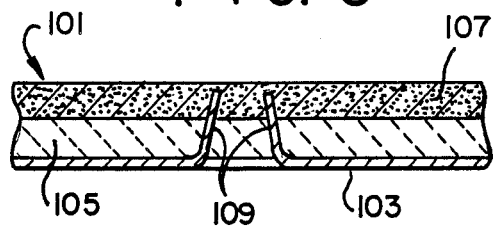
FIG. 3 is a magnified cross-sectional view of a composite sheet as in FIG. 1.

FIG. 3 is a cross-section view of the composite sheet 101 of FIG. 1, showing the metal layer 103, the refractory fiber layer 105, and the flexible graphite layer 107. Also illustrated is one of the projections 109, extending through the refractory fiber layer 105 into the flexible graphite layer 107.

Figure 4:
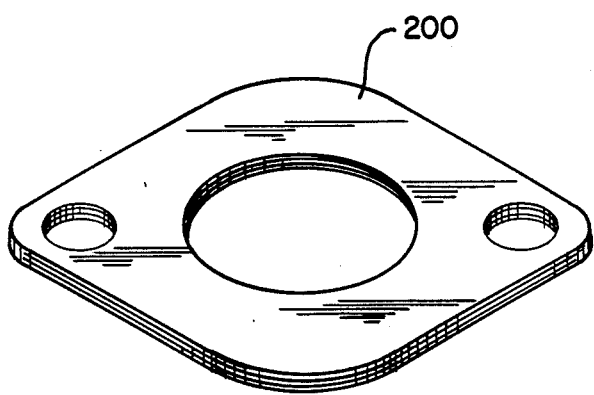
FIG. 4 is a perspective view of a gasket produced from a composite sheet of the invention.

FIG. 4 is a perspective view of gasket 200 manufactured from the composite sheet of the invention. The illustrated gasket is about 2½ inches long, and 1¾ inches wide. A similar gasket configuration is designed to go between the steel muffler assembly, and the aluminum head of a Briggs & Stratton air-cooled engine, as a replacement for Briggs & Stratton Part Number 270917. With the gasket in place, the insulation provided by the refractory fiber substantially reduces the flow back of heat from the muffler to the head after the engine has been turned off. Without this reduction, the flow back would be sufficient to damage the head. However, by use of an insulated gasket of the invention, the heat flow back is reduced to an extent to prevent damage to the head.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A composite sheet which comprises a sheet of metal, a sheet of thermally insulating refractory fiber, a sheet of flexible graphite, and a bonding means for bonding the sheets together with the thermally insulating refractory fiber sheet disposed between the sheet of metal and the sheet of flexible graphite.

2. The composite sheet of claim 1 wherein the sheet of metal is selected from the group consisting of steel, iron, aluminum, copper, and brass.

3. The composite sheet of claim 1 wherein the sheet of thermally insualting refractory fiber is selected from the group consisting of ceramic fibers, and glass fibers.

4. The composite sheet of claim 1 wherein the thickness of the metal sheet is between about 0.005 inches and about 0.01 inches.

5. The composite sheet of claim 1 wherein the thickness of the refractory fiber sheet is between about 0.02 inches and about 0.04 inches.

6. The composite sheet of claim 1 wherein the thickness of the flexible graphite sheet is between about 0.01 inches and about 0.02 inches.

7. The composite sheet of claim 1 comprising a plurality of refractory fiber and flexible graphite sheets.

8. The composite sheet of claim 1 wherein the bonding means in an adhesive.

9. The composite sheet of claim 1 wherein the bonding means is a mechanical fastening means.

10. The composite sheet of claim 9 wherein the mechanical fastening means comprises projections extending from the metal sheet, through the refractor fiber sheet, and into the flexible graphite sheet.

11. The composite sheet of claim 9 wherein the composite sheet is in the form of a gasket.

12. A method for manufacturing a composite sheet suitable for use as a gasket which method comprises bonding a sheet of metal, a sheet of thermally insulating refractory fiber, and a sheet of flexible graphite together, with the thermally insulating refractory fiber sheet disposed between the sheet of metal and the sheet of flexible graphite.

* * * * *

UNITED STATES PATENT AND TRADEMARK OFFICE
CERTIFICATE OF CORRECTION

PATENT NO. : 4,911,972
DATED : March 27, 1990
INVENTOR(S) : Robert A. Mercuri

It is certified that error appears in the above-identified patent and that said Letters Patent is hereby corrected as shown below:

Column 1, line 12, delete "uesd" and substitute therefore --used--.
Column 1, line 38, delete "stalltion" and substitute therefore --stallation--.

Column 2, line 26, delete "an" and substitute therefore --and--.
Column 2, line 55, delete "insualting" and substitute therefore --insulating--.

Column 3, line 56, delete "layer" and substitute therefore --layers--.
Column 4, line 10, delete "grpahite" and substitute therefore "graphite".
Column 6, line 12, "insualting" should read "insulating".

Signed and Sealed this

Ninth Day of July, 1991

*Attest:*

HARRY F. MANBECK, JR.

*Attesting Officer*     *Commissioner of Patents and Trademarks*